US012253790B1

(12) United States Patent
Chen (10) Patent No.: US 12,253,790 B1
(45) Date of Patent: Mar. 18, 2025

(54) QUICK-LOCKING SOFTBOX CHUCK AND SOFTBOX

(71) Applicant: YUEQING ORIGINALITY PHOTOGRAPHY EQUIPMENT CO., LTD., Yueqing (CN)

(72) Inventor: Qingyuan Chen, Yueqing (CN)

(73) Assignee: YUEQING ORIGINALITY PHOTOGRAPHY EQUIPMENT CO., LTD., Yueqing (CN)

( * ) Notice: Subject to any disclaimer, the term of this patent is extended or adjusted under 35 U.S.C. 154(b) by 0 days.

(21) Appl. No.: 18/647,011

(22) Filed: Apr. 26, 2024

(30) Foreign Application Priority Data

Nov. 8, 2023 (CN) .......................... 202311484104.X (51) Int. Cl.
*G03B 15/06* (2021.01)
(52) U.S. Cl.
CPC ...... *G03B 15/06* (2013.01); *G03B 2215/0589* (2013.01)
(58) Field of Classification Search
CPC .......................... G03B 15/06; G03B 2215/0589
See application file for complete search history.

(56) References Cited

U.S. PATENT DOCUMENTS

| 11,409,187 | B2* | 8/2022 | Kim ...................... G03B 15/06 |
| 11,719,999 | B1* | 8/2023 | Chen ..................... G03B 15/06 |
| | | | 362/16 |
| 11,988,944 | B1* | 5/2024 | Chen ..................... G03B 15/06 |
| 2005/0225989 | A1* | 10/2005 | Harlocker ............. G03B 15/06 |
| | | | 362/341 |

* cited by examiner

*Primary Examiner* — Tsion Tumebo
(74) *Attorney, Agent, or Firm* — Daniel M. Cohn; Howard M. Cohn (57) ABSTRACT

A quick-locking softbox chuck is disclosed, including: an umbrella disc seat having an annular shape and a lower surface thereof being provided with at least two through grooves; a plurality of first support seats and second support seats movably connected to the umbrella disc seat; a locking unit having a locked state in which the second support seat is unfolded with respect to the umbrella disc seat, and an unlocked state in which the second support seat is turned over to be below the umbrella disc seat via the through groove, so that the softbox is flat. A quick-locking softbox is also disclosed. The purpose of turning over the second support seat to be below the umbrella disc seat is achieved by the arrangement of the through groove. The folding and unfolding of the softbox can be achieved by turning over the second support seat, with simple operation.

20 Claims, 7 Drawing Sheets

QUICK-LOCKING SOFTBOX CHUCK AND SOFTBOX

TECHNICAL FIELD

The invention belongs to the technical field of photographic auxiliary appliances, and more particularly relates to a quick-locking softbox chuck and a softbox.

BACKGROUND

The softbox is installed on the video lamp, so that the light emitted by the film lamp is softer, and spots and shadows on the photograph can be eliminated when shooting. The softboxes on the market are mostly umbrella-shaped structures with open ends, and the open ends are used for connecting an external light source. When the softbox is stored, a plurality of support members are folded on the periphery of the open ends in a circular ring shape. Since the outer diameter of the open ends in the circular ring shape is relatively large, even in a folded state, the support members form a gap in a circumferential circle at a position close to the open ends. The storage volume is relatively large. It is inconvenient for carrying and transportation.

In order to solve the above-mentioned problems, a folding-type softbox appears in the market. In the design, the softbox umbrella disc is divided to two semi-circular structures. It forms a circular ring-shaped softbox umbrella disc by splicing the semi-circular umbrella discs. When folded, the two semi-circular umbrella discs are overlapped with each other in a vertical direction, so that the softbox is flat. For example, in the Chinese patent CN 209297081 U discloses a "Folding photomask rack", a first fixing member and a second fixing member thereof are both semi-circular ring-shaped structures and are both arranged on the surface of a seat body. The first fixing member and the second fixing member are connected in a folded-turnover way. However, this structure requires a base at the same time that the first fixing member and the second fixing member connected in a folded-turnover way, and requires a hook for fixing the second fixing member when it is fitted on the seat body of the circular ring structure. Moreover, it is relatively cumbersome to switch between folded-locking and unfolding states.

SUMMARY

In order to overcome the disadvantages of the prior art, the invention provides a quick-locking softbox chuck and a softbox. The invention is easy to fold and unfold for use, has a small volume after being folded, and is convenient for storage and transportation.

The technical solution used by the invention to solve the technical problem thereof is a quick-locking softbox chuck, including:
 an umbrella disc seat having an annular shape and a lower surface thereof being provided with at least one through groove;
 a plurality of first support seats and second support seats movably connected to the umbrella disc seat, wherein the second support seat is located in the through groove;
 a locking unit having a locked state in which the second support seat is unfolded with respect to the umbrella disc seat, and an unlocked state in which the second support seat is turned over to be below the umbrella disc seat via the through groove; and when the locking unit is in the unlocked state, the second support seat is turned over to be below the umbrella disc seat; and the plurality of first support seats are automatically swung and folded in a direction vertically overlapping with the second support seat, so that the softbox is flat.

In the invention, the umbrella disc seat has an annular shape. Compared with the umbrella disc seat formed by two semi-circular ring-shaped structures rotating and spliced together, the umbrella disc seat has a simpler and stable structure. The purpose of turning over the second support seat to be below the umbrella disc seat is achieved by the arrangement of the through groove, so that the second support seat and the first support seat are located at a same side of the umbrella disc seat. Thus, the softbox is folded in a flat shape, occupies a small space for storage, and is inconvenient for carrying and transportation. The folding and unfolding of the softbox can be achieved by turning over the second support seat. It is easy to operate and more convenient to use.

Further, a linkage part is provided between adjacent second support seats. The linkage part can realize the synchronous movement of the adjacent second support seat, so that the operation is more convenient and the unfolding and folding operation is more smooth.

Furthermore, the through groove includes a groove body I extending along a radial direction of the umbrella disc seat, and a groove body II located on an inner ring of the umbrella disc seat and forming an included angle with the groove body I, wherein the groove bodies II adjacent to the through groove are distributed in a splayed shape; and the through groove has a top wall capable of abutting against the second support seat. When the softbox is unfolded and used, the second support seat is located in the groove body I. When the softbox is folded and folded, the second support seat is located in the groove body II. The arrangement of the through groove not only realizes the folding and unfolding of the softbox pair, but also provides an accommodating and limiting space for the second support seat. The through groove has a top wall capable of abutting against the second support seat and the overall structure is more stable.

Furthermore, an end portion of the second support seat is provided with a movable connecting rod; the movable connecting rod and the second support seat are arranged at an oblique angle; and the movable connecting rod is rotatably provided on the umbrella disc seat. The arrangement of the movable connecting rod provides a limiting effect on the turnover of the second support seat, ensures that the second support seat rotates according to a set path until falling into the groove body I or the groove body II, and increases the flexibility of the turnover of the second support seat.

Further, the movable connecting rod is perpendicular to a rotation direction of the second support seat; and the included angle between the axes of the movable connecting rod and the second support seat is 20°-80°.

Further, the linkage part is connected in an arc shape to an outer wall of an adjacent second support seat along an outer ring of the umbrella disc seat. The linkage part not only realizes the synchronous movement of two adjacent second support seats, but also facilitates the operation. In addition, it not only increases the structural stability and does not occupy excessive space, but also does not interfere with the turnover of the second support seat.

Furthermore, the locking unit includes a locking key rotatably connected to the umbrella disc seat via a shaft body, and a reset piece abutting against the locking key, wherein the locking key is provided with an arc-shaped locking part capable of abutting against the outer wall of the second support seat. The locking unit achieves the locking or unlocking of the second support seat by means of the circumferential rotation of the locking key, and achieves the locking or unlocking operation of the second support seat by means of translation is more labor-saving. The locking key rotates in a vertical plane, reducing the space occupied by its movement, and the volume of the umbrella disc seat can be reduced.

Further, the arc-shaped locking parts on adjacent locking keys face oppositely. It is convenient for the user to operate two adjacent toggle parts to rotate towards each other with one hand, so as to achieve the purpose of unlocking two locking keys at the same time. The operation is convenient and quick.

Further, the locking key is formed with a toggle part which protrudes from the upper surface of the umbrella disc seat.

Further, the end portion of the first support seat is a ball head; the umbrella disc seat is provided with a limiting chamber; the ball head is movable in the limiting chamber; and the first support seat protrudes from the limiting chamber and is capable of swinging circumferentially, so that when the second support seat is turned over to be below the umbrella disc seat, the first support seat can be automatically folded in a direction vertically overlapping with the second support seat. The operator only needs to apply an external force on the locking unit and the linkage part to operate so as to realize the unfolding and folding of the softbox. The first support seat is automatically folded opposite to the second support seat in a vertical direction under the tension of the soft light cloth, without needing an operator to dial the first support seat one by one. The unlocking or unfolding operation is simple.

Further, the limiting chamber has a limiting groove; the umbrella disc seat is provided with an opening-enlarged cavity which is in communication with the limiting groove and is used for limiting the circumferential swinging stroke of the first support seat; and a bottom wall of the opening-enlarged cavity extends obliquely. The opening-enlarged cavity avoids excessive rotation of the first support seat. The bottom wall of the cavity is inclined. The first support seat can slide along the bottom wall of the opening-enlarged cavity to facilitate the unfolding of the softbox.

Further, the enlarging degree of the opening-enlarged cavity gradually decreases from a direction close to the through groove to a direction away from the through groove.

Further, the number of the second support seats is two; and the number of the through grooves is two. The structure design is relatively simple and the operation is more convenient.

The invention also discloses a quick-locking softbox, including: the above-mentioned chuck, a rod body, and a soft light cloth.

Advantageous effects of the invention: the umbrella disc seat is ring-shaped and has a simpler and stable structure. The purpose of turning over the second support seat to be below the umbrella disc seat is achieved by the arrangement of the through groove, so that the second support seat and the first support seat are located at a same side of the umbrella disc seat. Thus, the softbox is folded in a flat shape, occupies a small space for storage, and is inconvenient for carrying and transportation. The folding and unfolding of the softbox can be achieved by turning over the second support seat. It is easy to operate and more convenient to use. The operator only needs to apply an external force on the locking unit and the linkage part to perform an operation so as to realize the unfolding use and folding-gathering of the softbox. The first support seat is automatically overlapped to be opposite to the second support seat in the vertical direction under the action of the soft light cloth, without the operator needing to dial the first support seats one by one. The unlocking or unfolding operation is simple. The locking key rotates in a vertical plane, reducing the space occupied by its movement, and the volume of the umbrella disc seat can be reduced.

In the drawings, 1—umbrella disc seat, 11—limiting chamber, 12—limiting groove, 13—opening-enlarged cavity, 14—limit snap-fit groove, 2—through groove, 21—groove body I, 22—groove body II, 31—first support seat, 311—ball head, 32—second support seat, 321—movable connecting rod, 4—linkage part, 5—locking unit, 51—shaft body, 52—locking key, 53—reset piece, 54—arc-shaped locking part, 55—toggle part, 6—adapter.

DETAILED DESCRIPTION

In order that those skilled in the art may better understand the solutions of the invention, a clear and complete description of the technical solutions of the embodiments of the invention is provided below. Obviously, the described embodiments are only part of the embodiments of the invention, rather than all of the embodiments. Based on the embodiments in the invention, all other embodiments obtained by a person skilled in the art without involving any inventive effort should be within the scope of protection of the invention.

Figure 1:
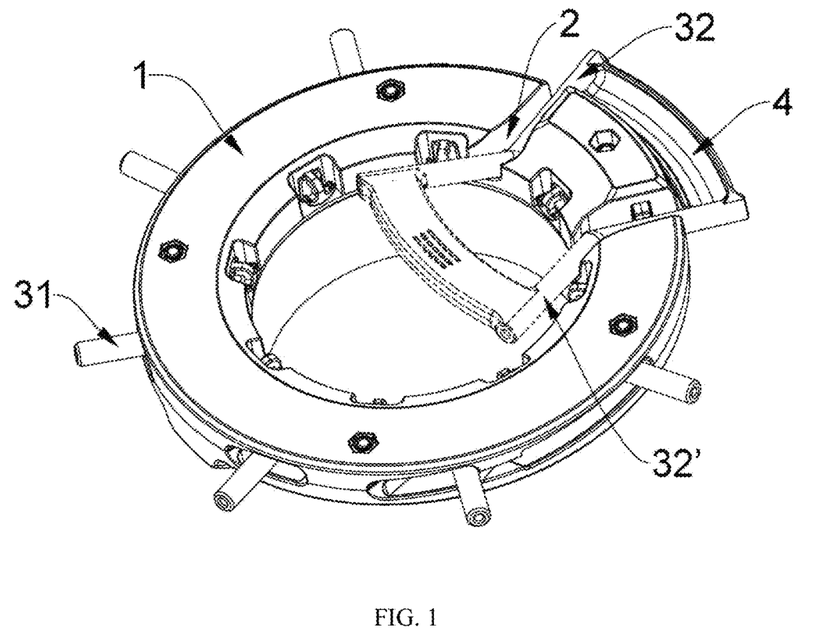
FIG. 1 is a schematic perspective view of a softbox chuck according to the invention, illustrating two states in which a second support seat is unfolded and turned over to be below an umbrella disc seat.
Figure 2:
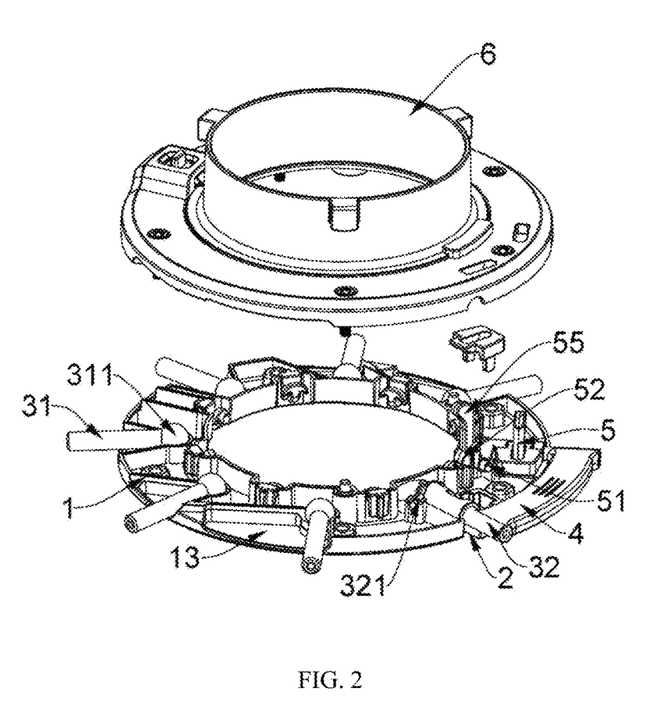
FIG. 2 is an exploded structural view of a softbox chuck according to the invention.

As shown in FIGS. 1 and 2, a quick-locking softbox chuck includes a ring-shaped umbrella disc seat 1. At least one through groove 2 is provided with a lower surface of the umbrella disc seat 1. A plurality of first support seats 31 and second support seats 32 are movably connected to the umbrella disc seat 1. The second support seats 32 are located in the through groove 2. In other words, the first support seats 31 are not located in the through groove 2, and the second support seats 32 are arranged corresponding to the through groove 2. A locking unit 5 is further included, which has a locked state in which the second support seat 32 is unfolded with respect to the umbrella disc seat 1, and an unlocked state in which the second support seat 32 is turned over to be below the umbrella disc seat 1 via the through groove 2, so that the softbox is flat. Specifically, when the locking unit 5 is in an unlocked state, the second support seat 32 is turned over to be below the umbrella disc seat 1, and the plurality of first support seats 31 are automatically swung and folded in a direction vertically overlapping with the second support seat 32, so that the softbox is flat.

Taking the example shown in FIG. 1 as an illustration, the position facing towards the principal plane is below the umbrella disc seat 1. The position facing away from the paper surface is an upper part of the umbrella disc seat 1. The second support seat 32 is turned counterclockwise to be below the umbrella disc seat 1. The state indicated by the second support seat 32' is that the locking unit 5 is in an unlocked state. At this time, a softbox with a soft light cloth may be folded from a three-dimensional state to a flat state, and the storage volume is greatly reduced.

In the present embodiment, the number of the second support seats 32 is two, and the number of the through grooves 2 is two. However, in other embodiments, the number of the second support seats 32 may be plural, and the invention is not limited thereto. Moreover, in the present embodiment, a linkage part 4 is positioned between the two second support seats 32. That is to say, the two second support seats 32 move together via the linkage part 4. Of course, in the other embodiments, the linkage part 4 may not be provided between the two second support seats 32, and the details are not limited.

Figure 3:
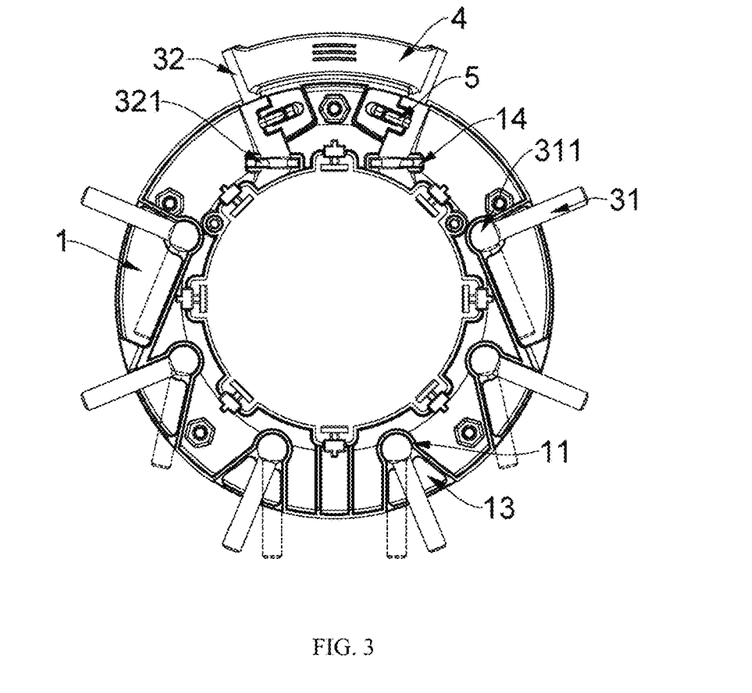
FIG. 3 is a schematic view illustrating a disassembled structure of a softbox chuck according to the invention, illustrating two states of the first support seat being unfolded and folded.

In the present embodiment, as shown in FIG. 3, the linkage part 4 is connected to the outer wall of the adjacent second support seat 32 along the arc of the outer ring of the umbrella disc seat 1. The linkage part 4 may also be provided with a structure such as a lug which is convenient for a user to operate.

Figure 4:
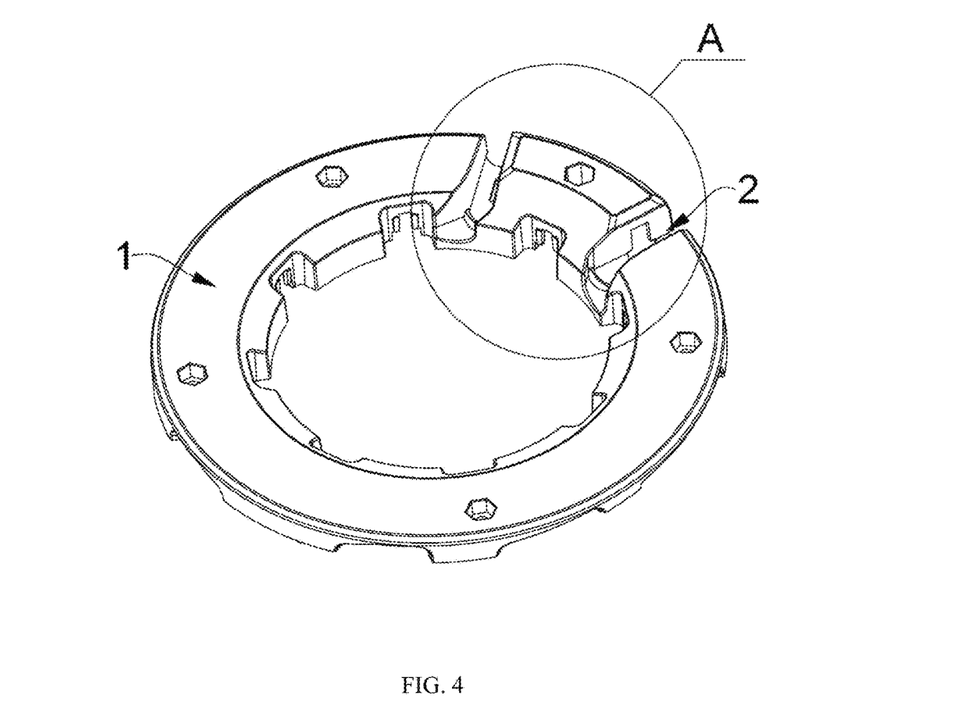
FIG. 4 is a partial schematic view I of a softbox chuck according to the invention.
Figure 5:
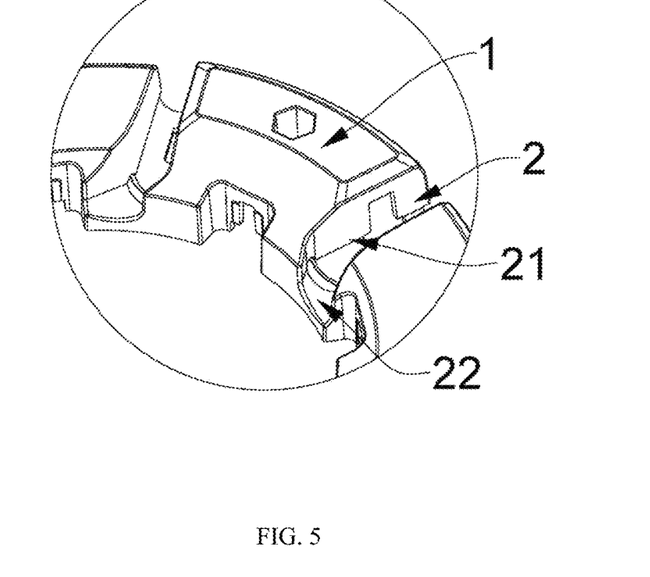
FIG. 5 is a structurally enlarged view at A in FIG. 4.

As shown in FIGS. 4 and 5, the through groove 2 includes a groove body I 21 extending in a radial direction along the umbrella disc seat 1, and a groove body II 22 located on an inner ring of the umbrella disc seat 1 and forming an included angle with the groove body I 21. The groove bodies II 22 adjacent to the through groove 2 are distributed in a splayed shape. Specifically, two adjacent groove bodies I 21 are in a splayed shape expanding towards the outer ring of the umbrella disc seat 1. Two adjacent groove bodies II 22 are in a splayed shape expanding towards the inner ring of the umbrella disc seat 1. The expansion angles of the groove bodies I 21 and the groove bodies II 22 are the same.

The through groove 2 means that the bottom thereof (for example, the direction in which the softbox chuck is opened and placed in a horizontal plane) is open, and the top thereof is closed and has a top wall 23 which may abut against the second support seat 32 when the second support seat 32 is unfolded and used with respect to the umbrella disc seat 1.

Figure 7:
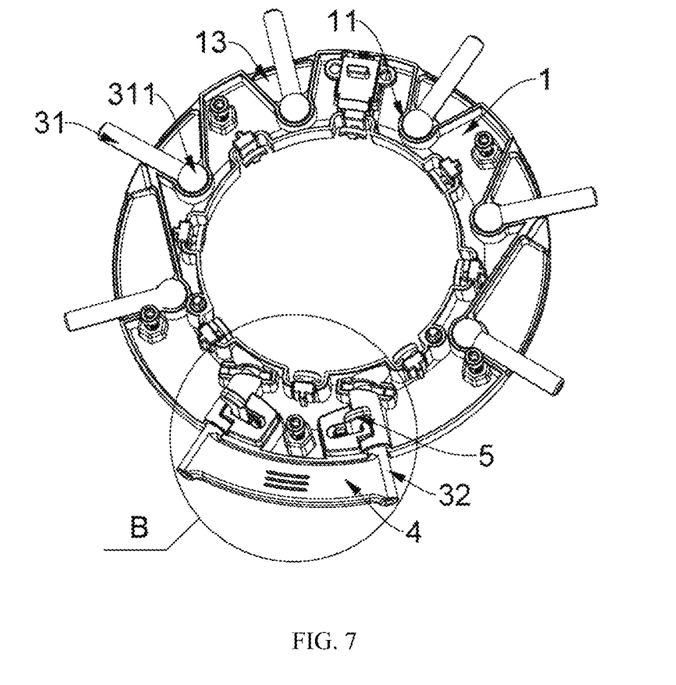
FIG. 7 is a structurally partial schematic view III of a softbox chuck according to the invention.
Figure 8:
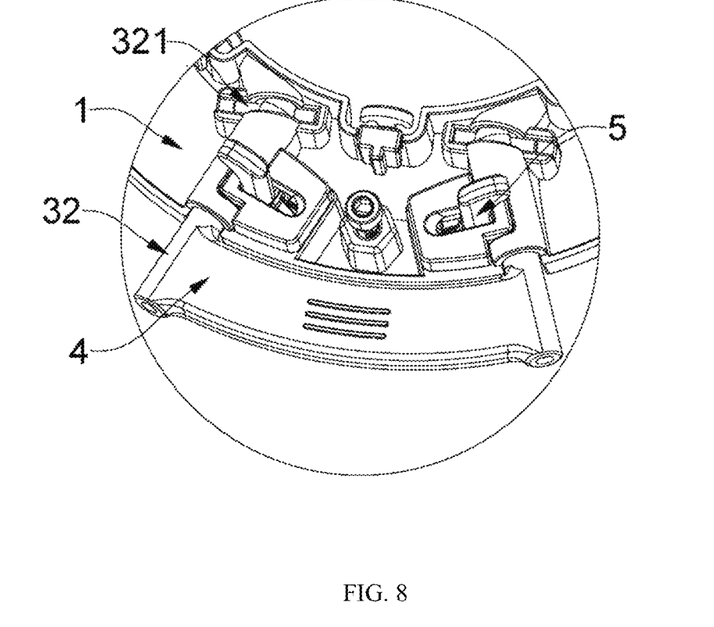
FIG. 8 is a structurally enlarged view at B in FIG. 7.
Figure 9:
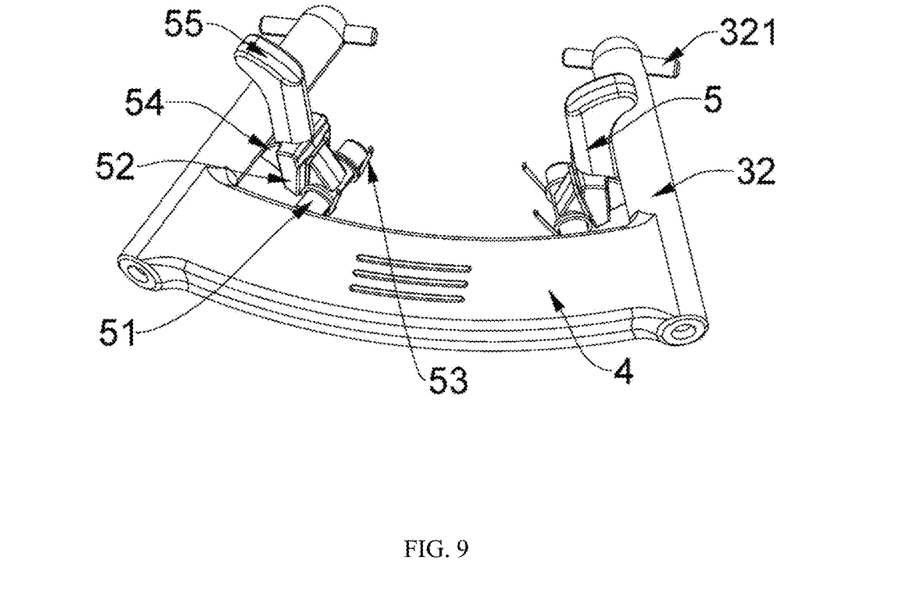
FIG. 9 is a structurally schematic view illustrating the matching of a locking unit and the second support seat according to the invention.
Figure 10:
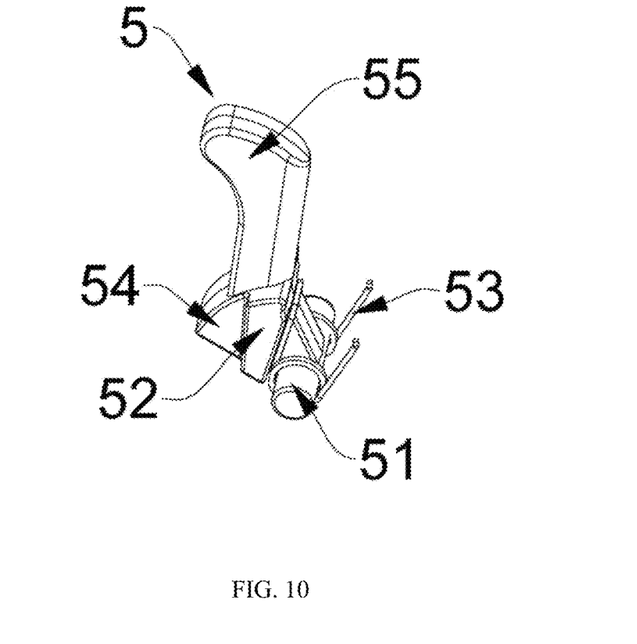
FIG. 10 is a structurally perspective view illustrating a locking unit according to the invention.
Figure 11:
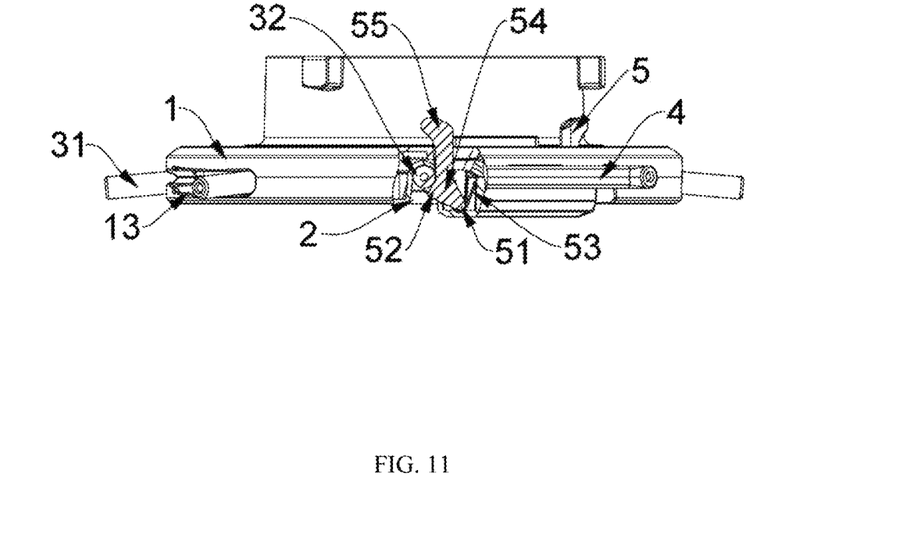
FIG. 11 is a front view of a softbox chuck of the invention when the locking unit is in a locked state.
Figure 12:
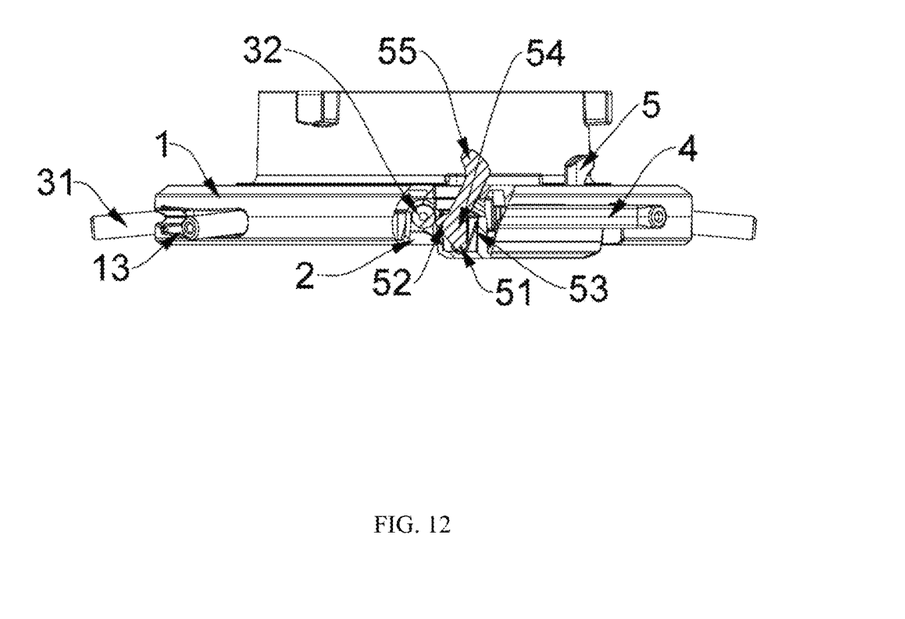
FIG. 12 is a front view of the softbox chuck of the invention when the locking unit is in an unlocked state.

As shown in FIGS. 7-9, the end portion of the second support seat 32 is provided with a movable connecting rod 321. The movable connecting rod 321 and the second support seat 32 are arranged at an oblique angle. Specifically, the inclined angle may be 20°-80°. The movable connecting rod 321 is rotatably arranged on the umbrella disc seat 1, and the movable connecting rod 321 is perpendicular to the rotation direction of the second support seat 32. The movable connecting rod 321 and the second support seat 32 may be integrally connected or separately provided. Specifically, when two adjacent second support seats 32 do not need to be linked, the movable connecting rod 321 and the second support seat 32 are integrally connected. In this embodiment, the movable connecting rod 321 and the second support seat 32 are relatively rotatable, or the movable connecting rod 321 may be disengaged from the second support seat 32. The movable connecting rod 321 and the second support seat 32 are not perpendicular to each other, but have an included angle other than 90.

In order to ensure the inclination angle of the movable connecting rod 321 and the second support seat 32, a limit snap-fit groove 14 adapted to the movable connecting rod 321 is positioned on the umbrella disc seat 1, so that the movable connecting rod 321 is prevented from freely moving.

As shown in FIGS. 9-12, the locking unit 5 includes a locking key 52 rotatably connected to the umbrella disc seat 1 via a shaft body 51, and a reset piece 53 abutting against the locking key 52. The locking key 52 is provided with an arc-shaped locking part 54 capable of abutting against the outer wall of the second support seat 32 and is formed with a toggle part 55 is formed. The toggle part 55 protrudes from the upper surface of the umbrella disc seat 1. In the present embodiment, the reset piece 53 is a torsion spring of which a closed end is sleeved on the shaft body 51. An open end of the torsion spring abuts against the umbrella disc seat 1.

The arc-shaped locking parts 54 on adjacent locking keys 52 are oppositely oriented, so that two adjacent toggle parts 55 may be operated by one hand. Thus, they rotate towards each other to achieve the purpose of unlocking two locking keys 52 at the same time. The operation is convenient and quick.

Of course, in other embodiments, the structure of the locking unit 5 may be a translational hanging structure as in the prior art, or a latching structure as in the prior art, without being limited thereto, as long as the locking and unlocking of the second support seat 32 may be achieved.

Figure 6:
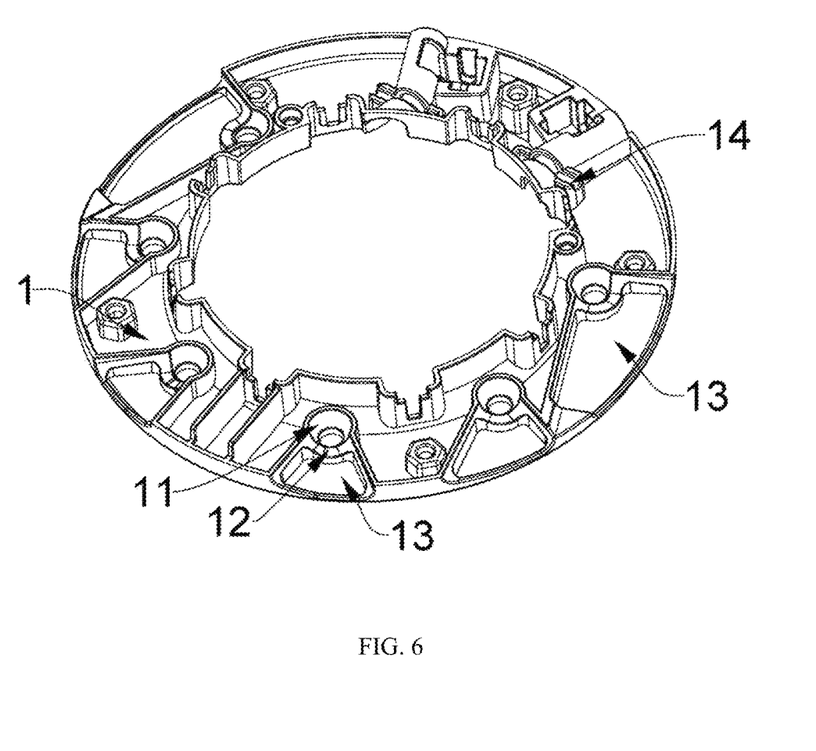
FIG. 6 is a structurally partial schematic view II of a softbox chuck according to the invention.

As shown in FIGS. 6 and 7, the end portion of the first support seat 31 is a ball head. The umbrella disc seat 1 is provided with a limiting chamber 11 for movably clamping the ball head. The limiting chamber 11 is a spherical cavity, and here the spherical cavity is not necessarily a complete sphere, just to say that the limiting chamber 11 is of a similar spherical structure. The cooperation of the ball head and the spherical cavity makes the rotation of the first support seat 31 relative to the limiting chamber 11 more flexible.

The limiting chamber 11 forms a limiting groove 12. The ball head of the first support seat 31 is clamped in the limiting chamber 11, and the other part thereof protrudes from the limiting groove 12, so that the first support seat 31 may swing along the circumferential direction of the softbox chuck after protruding from the limiting chamber 11. Thus, when the second support seat 32 is turned over below the umbrella disc seat 1, the first support seat 31 may be automatically folded together in a vertical direction overlapping with the second support seat 32 under the tension of the soft light cloth. The width of the limiting grooves 12 corresponding to the adjacent limiting chambers 11 may be unequal, and the width of the limiting grooves 12 at a position closer to the second support seat 32 is larger, so that a greater amplitude of swing of the first support seat 31 may be provided, facilitating the unfolding and folding of the first support seat 31.

Figure 13:
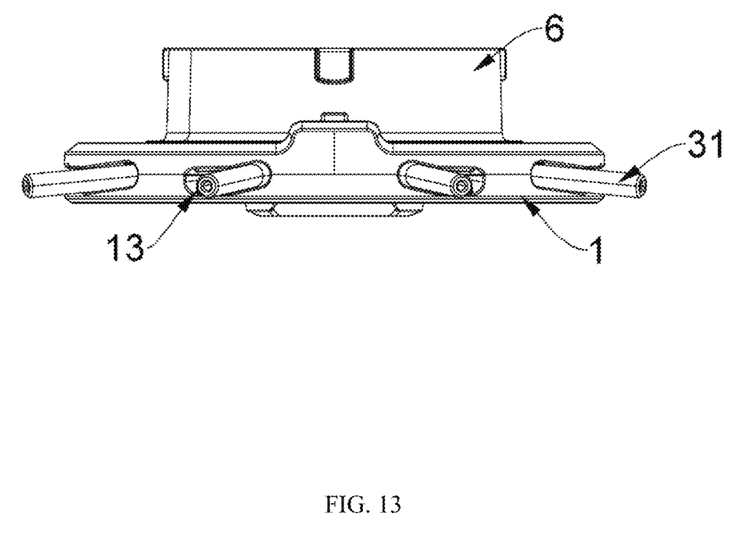
FIG. 13 is a front view of the softbox chuck of the invention.

The umbrella disc seat 1 is provided with an opening-enlarged cavity 13, which is in communication with the limiting groove 12 and is formed by an inclined wall extending outwards from the end portion of the limiting groove 12. When the first support seat 31 swings circumferentially to abut against the inclined wall, the first support seat 31 cannot continue to swing. In other words, the opening-enlarged cavity 13 is used to define the circumferential swing stroke of the first support seat 31. Furthermore, the opening-enlarged cavity 13 is located on the side wall of the outer ring of the umbrella disc seat 1 to extend obliquely. That is, as shown in FIGS. 6 and 13, the bottom wall of the opening-enlarged cavity 13 extends obliquely, and the closer to the position of the first support seat 31 when the softbox chuck is in a closed state, the higher the bottom wall is, so that when the first support seat 31 is unfolded, it can slide along the inclined bottom wall, facilitating the unfolded use of the softbox chuck.

As shown in FIG. 6, the enlarging degree of the opening-enlarged cavity 13 gradually decreases from a direction close to the through groove 2 to a direction away from the through groove 2.

In order to facilitate assembly, the umbrella disc seats 1 are each formed of a combination of upper and lower disc bodies. In order to facilitate the connection of the light source, the inner ring of the top surface of the umbrella disc seat 1 is provided with a receiving groove for detachable connection of an adapter 6 for connection of the light source.

A quick-locking softbox includes a softbox chuck, a rod body, and a soft light cloth (not shown in the drawings) constructed as described above. The inner ring of the softbox chuck is provided with a hook body for hanging a soft light cloth, so as to ensure that the softbox does not has a light leak.

In the present embodiment, the first support seat 31 and the second support seat 32 may be connected to a rod body. The rod body mainly functions to support a soft light cloth. The first support seat 31 and the second support seat 32 are used as a socket for the rod body. Of course, the first support seat 31, the second support seat 32 and the rod body may be integrally connected, without limitation for details. It should be noted that the first support seat 31 and the second support seat 32 are not only the socket shown in the figures, but also the whole part for supporting the soft light cloth.

Of course, the end portion of the first support seat 31 may not be a ball head structure, may be an L-shaped bent structure, or may be a T-shaped rotating shaft structure, without limitation for details.

The use process of the quick-locking softbox of the invention is as follows.

When the locking unit 5 is in a locked state, the second support seat 32 is unfolded with respect to the umbrella disc seat 1. At this time, the second support seat 32 abuts against the top wall of the groove body I 21. The arc-shaped locking part 54 protrudes in the through groove 2 and supports the second support seat 32 upwards to keep the second support seat 32 in an unfolded state. The first support seat 31 is also in an unfolded state.

When the softbox needs to be folded, an external force is applied to the toggle parts 55 to toggle same towards each other, so that both the two second support seats 32 are switched from the locked state to the unlocked state. An external force is applied to the linkage part 4 to turn over the second support seat 32 to be below the umbrella disc seat 1, namely, the second support seat 32 abuts against the top wall of the groove body II 22 (of course, they may not completely abut against each other, and only the second support seat 32 falls into the groove body II 22). At this time, driven by the soft light cloth, all the first support seats 31 are automatically folded towards each other, specifically in the direction where the second support seat 32 are folded in a vertical direction. In other words, as shown in FIG. 3, the second support seat 32 is turned over downwards, and all the first support seats 31 are also swung downwards, so that the first support seat 31 and the second support seat 32 or the first support seat 31, the second support seat 32 and the rod body are all folded downwards and overlapped. Thus, the three-dimensional softbox is folded to a flat shape, greatly reducing the storage volume.

When it is required to unfold the softbox, an external force is applied to the linkage part 4, so that the second support seat 32 rotates into the groove body I 21 of the through groove 2 when abutting against the locking key 52 until the arc-shaped locking part 54 locks the second support seat 32. At this time, driven by the soft light cloth, all the first support seats 31 are automatically unfolded. In particular, they can slide along the inclined bottom wall of the opening-enlarged cavity 13 to the unfolded state.

The foregoing detailed description is intended to be illustrative, but not limiting, of the invention. Within the scope of protection of the spirit of the invention and the claims, any modifications or changes made to the invention shall fall within the scope of protection of the invention.

What is claimed is:

1. A quick-locking softbox chuck, comprising:
   an umbrella disc seat (1) having an annular shape and a lower surface thereof being provided with at least one through groove (2);
   a plurality of first support seats (31) and second support seats (32) movably connected to the umbrella disc seat (1), wherein the second support seat (32) is located in the through groove (2);
   a locking unit (5) having a locked state in which the second support seat (32) is unfolded with respect to the umbrella disc seat (1), and an unlocked state in which the second support seat (32) is turned over to be below the umbrella disc seat (1) via the through groove (2); and
   when the locking unit (5) is in the unlocked state, the second support seat (32) is turned over to be below the umbrella disc seat (1); and the plurality of first support seats (31) are automatically swung and folded in a direction vertically overlapping with the second support seat (32), so that the softbox is flat.

2. The quick-locking softbox chuck according to claim 1, wherein a linkage part (4) is provided between adjacent second support seats.

3. The quick-locking softbox chuck according to claim 1, wherein the through groove (2) comprises a groove body I (21) extending along a radial direction of the umbrella disc seat (1), and a groove body II (22) located on an inner ring of the umbrella disc seat (1) and forming an included angle with the groove body I (21), wherein the groove bodies II (22) adjacent to the through groove (2) are distributed in a splayed shape; and the through groove (2) has a top wall (23) capable of abutting against the second support seat (32).

4. The quick-locking softbox chuck according to claim 1, wherein an end portion of the second support seat (32) is provided with a movable connecting rod (321); the movable connecting rod (321) and the second support seat (32) are arranged at an oblique angle; and the movable connecting rod (321) is rotatably provided on the umbrella disc seat (1).

5. The quick-locking softbox chuck according to claim 1, wherein the movable connecting rod (321) is perpendicular to a rotation direction of the second support seat (32); and the included angle between the axes of the movable connecting rod (321) and the second support seat (32) is 20°-80°.

6. The quick-locking softbox chuck according to claim 2, wherein the linkage part (4) is connected in an arc shape to an outer wall of an adjacent second support seat (32) along an outer ring of the umbrella disc seat (1).

7. The quick-locking softbox chuck according to claim 1, wherein the locking unit (5) comprises a locking key (52) rotatably connected to the umbrella disc seat (1) via a shaft body (51), and a reset piece (53) abutting against the locking key (52), wherein the locking key (52) is provided with an arc-shaped locking part (54) capable of abutting against the outer wall of the second support seat (32).

8. The quick-locking softbox chuck according to claim 7, wherein the arc-shaped locking parts (54) on adjacent locking keys (52) face oppositely.

9. The quick-locking softbox chuck according to claim 7, wherein the locking key (52) is formed with a toggle part (55) which protrudes from the upper surface of the umbrella disc seat (1).

10. The quick-locking softbox chuck according to claim 1, wherein the end portion of the first support seat (31) is a ball head (311); the umbrella disc seat (1) is provided with a limiting chamber (11); the ball head (311) is movable in the limiting chamber (11); and the first support seat (31) protrudes from the limiting chamber (11) and is capable of swinging circumferentially.

11. The quick-locking softbox chuck according to claim 10, wherein the limiting chamber (11) has a limiting groove (12); the umbrella disc seat (1) is provided with an opening-enlarged cavity (13) which is in communication with the limiting groove (12) and is used for limiting the circumferential swinging stroke of the first support seat (31); and a bottom wall of the opening-enlarged cavity (13) extends obliquely.

12. The quick-locking softbox chuck according to claim 10, wherein the enlarging degree of the opening-enlarged cavity (13) gradually decreases from a direction close to the through groove (2) to a direction away from the through groove (2).

13. The quick-locking softbox chuck according to claim 1, wherein the number of the second support seats (32) is two; and the number of the through grooves (2) is two.

14. A quick-locking softbox, comprising the chuck according to claim 1, a rod body, and a soft light cloth.

15. The quick-locking softbox according to claim 14, wherein a linkage part (4) is provided between adjacent second support seats.

16. The quick-locking softbox according to claim 14, wherein the through groove (2) comprises a groove body I (21) extending along a radial direction of the umbrella disc seat (1), and a groove body II (22) located on an inner ring of the umbrella disc seat (1) and forming an included angle with the groove body I (21), wherein the groove bodies II (22) adjacent to the through groove (2) are distributed in a splayed shape; and the through groove (2) has a top wall (23) capable of abutting against the second support seat (32).

17. The quick-locking softbox according to claim 14, wherein an end portion of the second support seat (32) is provided with a movable connecting rod (321); the movable connecting rod (321) and the second support seat (32) are arranged at an oblique angle; and the movable connecting rod (321) is rotatably provided on the umbrella disc seat (1).

18. The quick-locking softbox according to claim 14, wherein the movable connecting rod (321) is perpendicular to a rotation direction of the second support seat (32); and the included angle between the axes of the movable connecting rod (321) and the second support seat (32) is 20°-80°.

19. The quick-locking softbox according to claim 15, wherein the linkage part (4) is connected in an arc shape to an outer wall of an adjacent second support seat (32) along an outer ring of the umbrella disc seat (1).

20. The quick-locking softbox according to claim 14, wherein the locking unit (5) comprises a locking key (52) rotatably connected to the umbrella disc seat (1) via a shaft body (51), and a reset piece (53) abutting against the locking key (52), wherein the locking key (52) is provided with an arc-shaped locking part (54) capable of abutting against the outer wall of the second support seat (32).

\* \* \* \* \*